(12) United States Patent
Lakshman et al.

(10) Patent No.: US 11,244,156 B1
(45) Date of Patent: Feb. 8, 2022

(54) LOCALITY-SENSITIVE HASHING TO CLEAN AND NORMALIZE TEXT LOGS

(71) Applicant: A9.com, Inc., Palo Alto, CA (US)

(72) Inventors: Vihan Sankaran Lakshman, Palo Alto, CA (US); Chen Luo, Sunnyvale, CA (US); Yeshwant Dattatreya, San Jose, CA (US); Nan Jiang, West Lafayette, IN (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 17/083,921

(22) Filed: Oct. 29, 2020

(51) Int. Cl.
*G06K 9/00* (2006.01)
*G06F 16/901* (2019.01)

(52) U.S. Cl.
CPC ....... *G06K 9/0051* (2013.01); *G06F 16/9014* (2019.01); *G06K 9/00523* (2013.01); *G06K 9/00536* (2013.01)

(58) Field of Classification Search
None
See application file for complete search history.

(56) References Cited

U.S. PATENT DOCUMENTS

| | | | | |
|---|---|---|---|---|
| 9,430,567 | B2* | 8/2016 | Kondratova | G06F 16/9535 |
| 9,852,231 | B1* | 12/2017 | Ravi | G06N 20/00 |
| 10,430,464 | B1* | 10/2019 | Ravi | G06N 20/00 |
| 10,521,413 | B2* | 12/2019 | Pappu | G06F 16/2255 |
| 11,048,702 | B1* | 6/2021 | Kumar | G06N 3/0427 |
| 2010/0174714 | A1* | 7/2010 | Asmundsson | G06F 16/2246 |
| | | | | 707/737 |
| 2012/0284275 | A1* | 11/2012 | Vadrevu | G06F 16/358 |
| | | | | 707/738 |
| 2017/0147575 | A1* | 5/2017 | Pappu | G06F 16/9014 |
| 2018/0210896 | A1* | 7/2018 | Guo | G06F 16/00 |
| 2020/0133931 | A1* | 4/2020 | Pappu | G06F 16/248 |
| 2021/0117459 | A1* | 4/2021 | Tan | G06K 9/6296 |

OTHER PUBLICATIONS

Beidi Chen, Anshumali Shrivastava, and Rebecca C. Steorts, "Unique Entity Estimation with Application to the Syrain Conflict," arXiv:1710.02690v1 [stat.AP] Oct. 7, 2017, 35 pages.
Ping Li, Art B. Owen, Cun-Hui Zhang, "One Permutation Hashing," 2012, 9 pages.
Valentin Malykh, Varvara Logacheva and Taras khakhulin, "Robust Word Vectors: Context-Informed Embeddings for Noisy Texts," Neural Systems and Deep Learning Laboratory, Moscow Institute of Physics and Technology, Moscow, Russia, EMNLP Workshop, Nov. 1, 2018, 10 pages.

(Continued)

*Primary Examiner* — Anand P Bhatnagar
(74) *Attorney, Agent, or Firm* — Patterson + Shendan, LLP

(57) ABSTRACT

Techniques for improved text normalization are provided. Signatures are generated for a first word and a second word using a locality-sensitive hashing technique. A graph is constructed based on the first and second signatures, by creating a first node in the graph for the first word, creating a second node in the graph for the second word, and creating an edge in the graph connecting the first and second nodes upon determining that the first and second signatures match. A mapping from the first word to the second word is then generated based on the graph.

20 Claims, 11 Drawing Sheets

(56) References Cited

OTHER PUBLICATIONS

Benjamin Muller, Benoit Sagot, Djame' Seddah, "Enhancing BERT for Lexical Normalization," 2019 EMNLP Workshop, Nov. 4, 2019, 10 pages.

Ping Li, Xiaoyun Li and Cun-Hui Zhang, "Re-randomized Densification for One Permutation Hashing and Bin-wise Consistent Weighted Sampling," 33rd Conference on Neural Information Processing Systems, 2019, 11 pages.

Ranveer A. Faruquie and L. Venkata Subramaniam, "Unsupervised Cleansing of Nosiy Text," Coling 2010, Poster Volume, 8 pages, Beijing, Aug. 2010.

* cited by examiner

LOCALITY-SENSITIVE HASHING TO CLEAN AND NORMALIZE TEXT LOGS

BACKGROUND

The present disclosure relates to text normalization, and more specifically, to utilizing locality-sensitive hashing to normalize textual data.

A wide variety of systems and processes (such as training machine learning models) rely heavily on the quality of the underlying dataset. In text applications, significant effort has been expended to create benchmark datasets extracted from high quality sources. However, models trained on clean datasets have been shown to perform significantly worse when evaluated on realistic (noisy) texts. Textual data extracted from a variety of sources (e.g., social media, search logs, and the like) often contain a large number of spelling errors, typographical errors, and non-standard punctuation or spelling. Such datasets require significant preprocessing in order to clean them before use.

Some efforts have been made to clean or normalize such datasets in order to facilitate their use in a variety of systems. These traditional efforts attempt to mitigate the gap between clean, high-quality datasets and the real-world noisy sets, and may serve as a preprocessing step in a machine learning pipeline. Such traditional efforts generally utilize techniques such as spelling correction, stemming, and lemmatization. However, these existing approaches are computationally expensive and require significant time and resources to execute. Thus, they are often prohibitively expensive to execute over large scale datasets.

DETAILED DESCRIPTION

Embodiments of the present disclosure provide techniques to clean and normalize input data in a scalable and efficient manner utilizing locality-sensitive hashing (LSH) and graph structures. In an embodiment, the techniques described herein utilize randomized hashing which can handle multiple variations (such as misspellings and morphological variants) at once, and eliminates the need for explicit heuristics. Additionally, some embodiments disclosed herein provide techniques to construct graph structures that fit to the dataset distribution, so neither supervised learning nor extra labels are required. Further, in at least one embodiment, the statistics of the insertion, deletion, and replacement probability in the dataset is represented by edge weights in the graph structure, so the system does not rely on data-dependent statistical models.

In embodiments, the system described herein utilizes LSH techniques to map words (also referred to as tokens) into discrete bins, such that tokens with high Jaccard similarity are hashed to the same bin. After the hashing, co-located words can be modeled as vertices in a graph identifying connected components of lexically similar words. In an embodiment, the output of the system is a mapping from word variants to a canonical form (e.g., a correctly-spelled and standard form of the word), or vocabulary represented as a list of all the representative words in every connected component in the graph.

Because the LSH techniques may use only linear computation based on the length of the input word, the techniques described herein are considerably more efficient and less computationally-intense than baseline techniques such as spell correction. That is, embodiments of the present disclosure perform data normalization far more rapidly than existing approaches, and utilize far fewer computational resources in the process. This enables computing devices to operate more efficiently and provides significant scalability for large datasets. Further, by performing such automated and rapid normalization, the resulting clean datasets can be readily used to train machine learning models (or for any other purpose). In this way, the resulting models or other downstream systems are improved. Moreover, because the presently-disclosed techniques are computationally-efficient and scalable, the process can be applied to input data during runtime, rather than solely as a pre-processing step in training models.

Figure 1A:
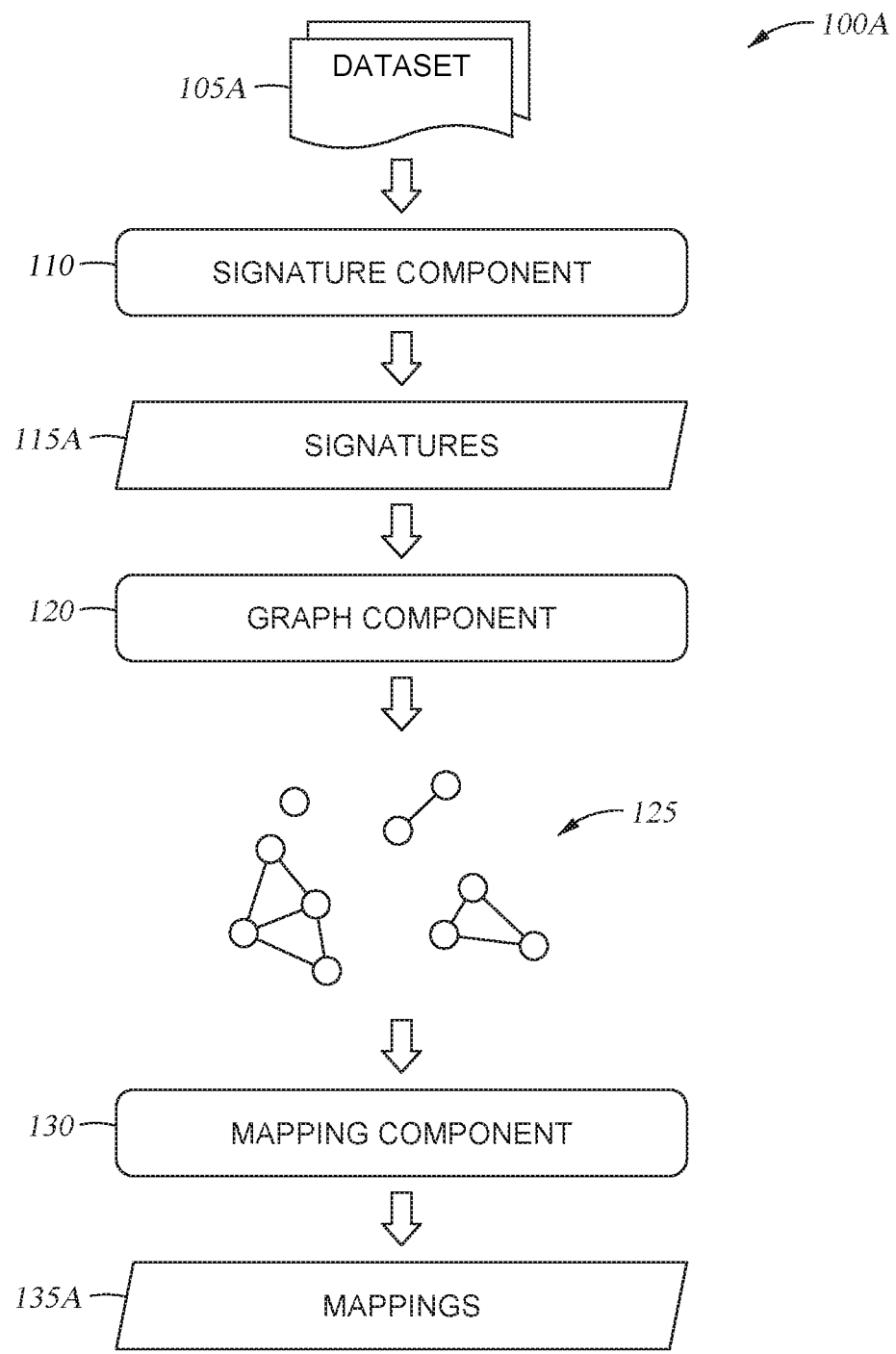
FIG. 1A depicts a workflow for generating mappings to normalize datasets using locality-sensitive hashing, according to some embodiments disclosed herein.

FIG. 1A depicts a workflow 100A for generating mappings to normalize datasets using LSH, according to some embodiments disclosed herein. In the illustrated embodiment, the workflow 100A utilizes a Signature Component 110, Graph Component 120, and Mapping Component 130. Although depicted as discrete components for conceptual clarity, in embodiments, the workflow 100A may utilize any combination of components or devices. In one embodiment, the illustrated components operate as part of a normalization system.

The illustrated workflow 100A begins when one or more Datasets 105A are received as input for the Signature Component 110. As illustrated, the Signature Component 110 evaluates the Dataset(s) 105A to generate a set of Signatures 115A. In one embodiment, each Signatures 115A corresponds to a word or token from the Dataset 105A. For example, if the Dataset 105A is textual data (e.g., "the quick brown fox"), the Signature Component 110 can generate a corresponding Signature 115A for each word in the text. In an embodiment, although identical words or tokens will generally have identical Signatures 115A, word variants (e.g., "good," "goood," and "gooood") will generally be assigned different Signatures 115A.

In embodiments, the Signature Component 110 utilizes LSH to process the Dataset 105A, such that the resulting Signatures 115A can be used to identify variants for a given word (e.g., to map "goood" to the canonical "good"). In an embodiment, the Signature Component 110 first generates a set of substrings for each word or token in the input. For example, for an input word "the," the substrings are "t," "h," "e," "th," "he," and "the." In some embodiments, as discussed in more detail below, the Signature Component 110 only utilizes a subset of the substrings for further processing (e.g., only the substrings of length one, three, and five). This can accelerate the signature-generation process.

In some embodiments, after the substrings are created, the Signature Component 110 utilizes LSH to generate a hash value for each substring. These hash values are then partitioned into bins or buckets as described in more detail below. In at least one embodiment, the Signature Component 110 utilizes a minimum-hashing technique and utilizes only the smallest value in each bin for further processing. For example, if a bin includes hash values of fifty and seventy, the Signature Component 110 will retain only the hash value of fifty to generate the Signature 115A.

In at least one embodiment, if any bins remain empty (that is, if no hash values for any substrings were partitioned into a bin), the Signature Component 110 can fill the bin by copying an adjacent value from the next-closest bin to the left or right that has a value. After the hashes are partitioned, in an embodiment, the Signature Component 110 applies another hashing technique on the set of retained hashes from each bin in order to generate a final Signature 115A for the input word. This signature-generation process is described in more detail below, particularly with respect to FIGS. 2 and 5.

In the workflow 100A, the Signatures 115A are provided to a Graph Component 120. Based on the Signatures 115A, the Graph Component 120 generates a Graph 125. The Graph 125 generally reflects the lexical similarity of the input words. In an embodiment, each node in the graph corresponds to a particular word or token in the input Dataset 105A, and each edge connecting two nodes indicates that the corresponding words were assigned matching Signatures 115A.

In at least one embodiment, the signature-generation process is repeated multiple times in order to generate Signatures 115 based on the same input Dataset 105. This is because LSH has some elements of randomness in the process, which may lead to dissimilar words being assigned to the same group due to undesirable hash collisions. Especially for large datasets, the chance of at least one pair of dissimilar words sharing a signature becomes quite significant, which leads to poor normalization. In an embodiment, therefore, the Signature Component 110 generates multiple Signatures 115A for each word in the input Dataset 105, and a graph-based approach is used to prune these noisy word associations.

In some embodiments, the presence of an edge connecting two nodes in the Graph 125 indicates that the words corresponding to those nodes were assigned matching Signatures 115 in at least one round of the signature-generation process. In an embodiment, the Graph Component 120 assigns a weight to each edge based on the number of times they were assigned matching Signatures 115. That is, the edge weight between two nodes or vertices $w_1$ represents the number of times the two corresponding words were assigned the same Signature 115. In another embodiment, the weight of the edge is assigned based on the frequency or proportion of times the words had matching signatures. For example, if the signature-generation process is performed ten times and two words were assigned the same signature eight times, the weight of the edge may be eight or 0.8 in various embodiments. In at least one embodiment, the Graph Component 120 may prune (or refrain from creating and inserting) edges with a weight below a predefined threshold, as discussed in more detail below.

As illustrated, the Graph 125 is provided to a Mapping Component 130 which analyzes it to create a set of Mappings 135A. In one embodiment, the Mapping Component 130 does so by identifying disconnected subgraphs in the Graph 125. In another embodiment, the Mapping Component 130 identifies connected components in the Graph 125. That is, the Mapping Component 130 may identify, for each node in the graph, all other nodes that are connected to it (directly via an edge or indirectly via edges through other nodes). In some embodiments, the Graph 125 includes a number of disconnected subgraphs where each subgraph corresponds to a particular canonical word and the nodes in the graph each correspond to variants of that canonical word.

In some embodiments, once the subgraphs of connected components are identified, the Mapping Component 130 maps all of the words represented by nodes in each subgraph to a canonical word (also referred to as a pivot word). In one embodiment, the Mapping Component 130 identifies the word or token represented by each node in the subgraph, and select one of these words or tokens to serve as a pivot word for the subgraph. For example, in one such embodiment, the Mapping Component 130 identifies the word that occurs most frequently in the Dataset 105A, and uses this word as the pivot for the subgraph. The Mappings 135A are then generated, indicating that all other words in the subgraph should be mapped to the selected pivot word.

In this way, the Mappings 135A can be used to readily normalize the Dataset 105A. In one embodiment, the system does so by replacing the unselected words in the Graph 125 with their corresponding pivot, as indicated by the Mappings 135A. For example, suppose the Mappings 135A indicate that "goood" and "gooood" both map to a pivot word "good." In an embodiment, the system may parse the Dataset 105A, and replace all instances of "goood" and "gooood" with "good."

Figure 1B:
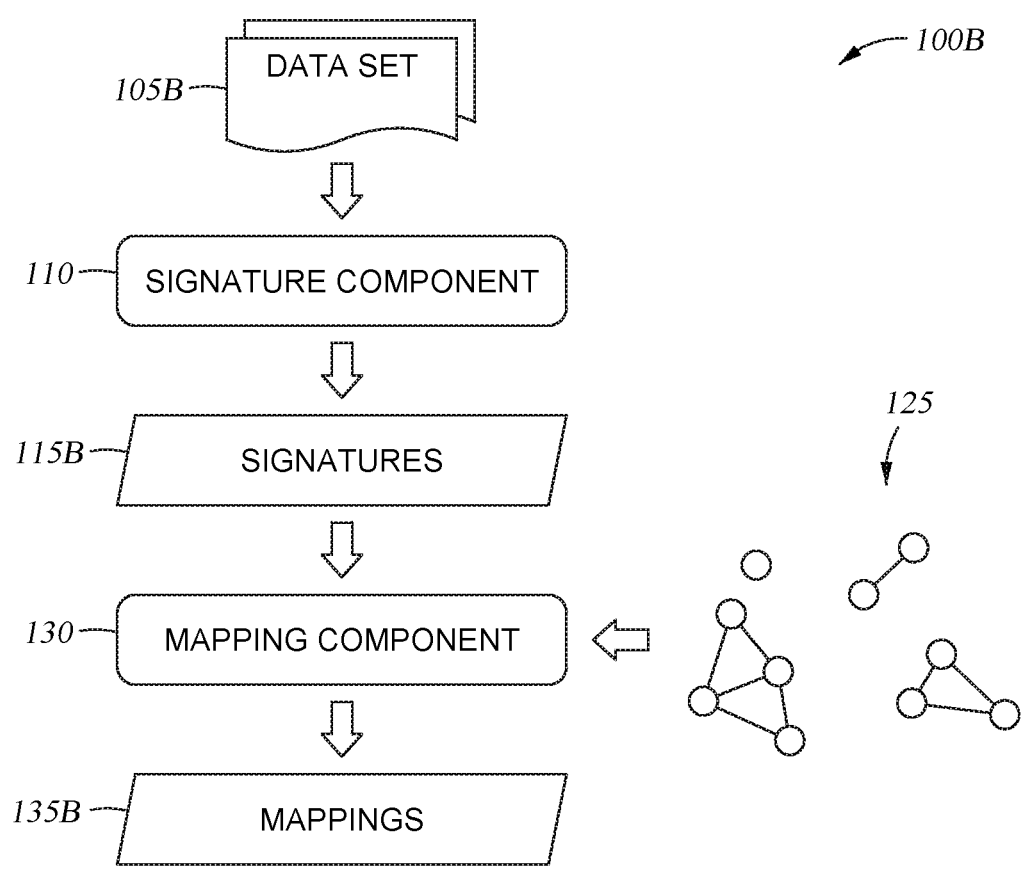
FIG. 1B depicts a workflow for utilizing a graph structure to normalize new datasets using locality-sensitive hashing, according to some embodiments disclosed herein.

FIG. 1B depicts a workflow 100B for utilizing a graph structure to normalize new datasets using LSH, according to some embodiments disclosed herein. Specifically, the workflow 100B may be utilized after the workflow 100A, and depicts use of an existing Graph 125 (e.g., created using workflow 100A) during runtime to process new datasets. In the illustrate workflow 100B, a new Dataset 105B is received. In an embodiment, the system may first use the Mappings 135A to insert the relevant pivot words into the Dataset 105B, where applicable. If any words are not found in the Mappings 135A, however (e.g., because they were not included in the original Dataset 105A), the missing words can be provided to the Signature Component 110.

In an embodiment, the Signature Component 110 processes the identified (unknown) words to generate Signatures 115B for each, as discussed above. In at least one embodiment, the Signature Component 110 generates a set of Signatures 115B for each word, in order to account for the randomness of the LSH operations. In the illustrated embodiment, these Signatures 115B are then provided to the Mapping Component 130, which uses them to search the Graph 125.

That is, the Mapping Component 130 can determine whether any of the newly-generated Signatures 115B are already reflected in the Graph 125. In embodiments, even if a given word or token has not yet been seen and incorporated into the Graph 125, the same Signature 115 may have already been generated for another (potentially related) word. If the Mapping Component 130 determines that the Signature 115 for a new word is already reflected in the Graph 125, in one embodiment, the Mapping Component 130 can generate a Mapping 135B indicating that the new word should be mapped to the same pivot word as the existing node sharing the same signature. If the Signature 115 is not included in the Graph 125, the Mapping Component 130 may determine that the new word is outside of the vocabulary and cannot be mapped to any included words.

In some embodiments, the signature-generation process is repeated for each new word, as discussed above. In such an embodiment, if the new Signatures 115B match multiple signatures in the Graph 125, the Mapping Component 130 may determine that the new word is related to the existing word with which the new Signature 115B matched the most times. In some embodiments, the Mapping Component 130 similarly compares this number to a predefined threshold in order to determine whether the relationship is significant, as discussed above. If so, the Mapping Component 130 can map the new word to the existing word. If not, the new word is not mapped to any existing word. In this way, the Graph 125 created using the workflow 100A depicted in FIG. 1A can be used in the workflow 100B to process newly-identified words in new datasets.

Figure 2:
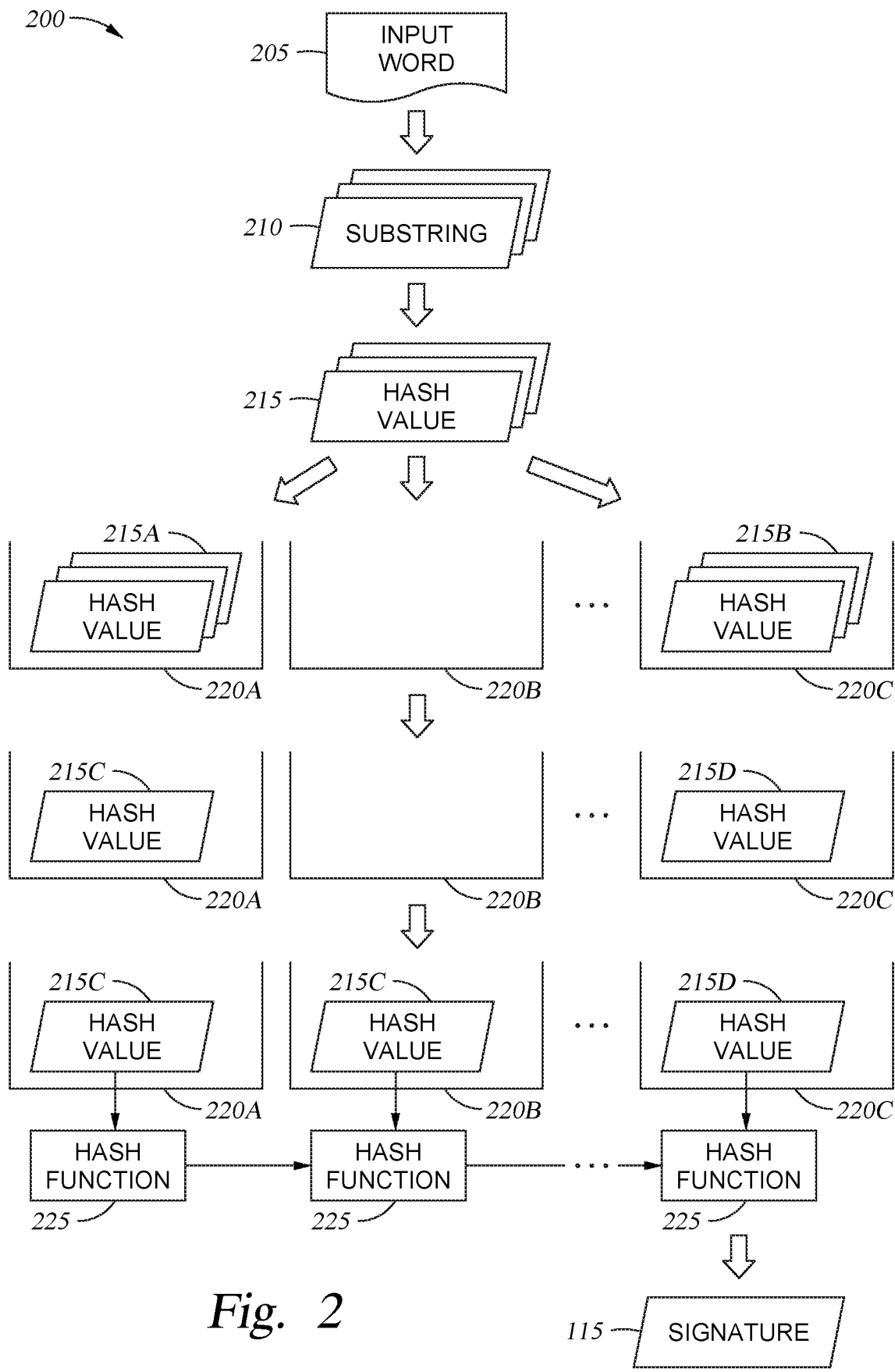
FIG. 2 illustrates a workflow for generating a signature for an input word using locality-sensitive hashing, according to some embodiments disclosed herein.

FIG. 2 illustrates a workflow 200 for generating a signature for an input word using LSH, according to some embodiments disclosed herein. In one embodiment, the workflow 200 provides additional detail for the signature-generation process performed by the Signature Component 110 in FIGS. 1A and 1B. In the illustrated embodiment, an Input Word 205 is received by the system. Although the illustrated embodiment includes a word, in embodiments, any textual token can be used as input. As illustrated, the Input Word 205 is processed to create a set of Substrings 210 based on the Input Word 205.

Specifically, a word w of n characters $c_1c_2 \ldots c_n$ can be sliced into a set of substrings $S(w)=\{c_1, \ldots, c_n\} \cup \{c_1c_2, \ldots c_{n-1}c_n\} \cup \{c_1c_2c_3, \ldots, c_{n-2}c_{n-1}c_n\} \ldots \cup \{c_1c_2 \ldots c_n\}$. That is, S(w) is the union of character n-gram sets. For example, the substrings set of a word "good" is: S(good)={g, o, d}∪{go, oo, od}∪{goo, ood}∪{good}. In some embodiments, rather than generate or utilize all substrings of the Input Word 205, the system utilizes a hyperparameter to denote which substrings will be included in the set. For example, if the inclusion parameter is [1, 3, 5], the character-level unigram, the trigram, and the 5-gram sets will be included into the overall set S (w).

In one embodiment, if the substring length is longer than the length Input Word 205, its corresponding n-gram set is defined to be 0. Continuing the above example of a [1, 3, 5] parameter for word "good", then S(good)={g, o, d}∪{goo, ood}.

In an embodiment, generating a limited set of Substrings 210 can improve performance and reduce latency of the signature-generation process. However, generating additional substrings can yield more accurate results (e.g., fewer false positives and false negatives). Thus, the particular inclusion parameter may be decided according to any suitable criteria and may vary based on the particular implementation.

Once this set of Substrings 210 is generated, they are used to generate a set of Hash Values 215. That is, each Substring 210 is processed to generate a corresponding Hash Value 215. In an embodiment, this hash function is used to map every Substring 210 into a large universe U, aiming to map each substring uniformly in the large universe U with low collision probability. In one embodiment, the SHA256 hash function is utilized to create the Hash Values 215.

In the illustrated workflow 200, the system then utilizes one permutation hashing to hash the output of above step (the Hash Values 215). To do so, as illustrated, the universe U is partitioned into Bins 220A-C, and the set of Hash Values 215 will be correspondingly partitioned. For example, if the universe U includes integers from zero to five hundred, the bins may correspond to values [0, 100), [100, 200), [200, 300), [300, 400), and [400, 500]. In an embodiment, the number of Bins 220 (and thus the size of each Bin 220) is a hyperparameter that may be set to adjust the performance and accuracy of the signature-generation process. Generally, larger Bins 220 (resulting in a smaller overall number of discrete partitions) increase the performance of the process, but reduce the accuracy of the results.

In an embodiment, the Hash Values 215 are assigned to the Bin 220 based on their value. For example, if the first Bin 220A includes values from zero to one hundred, all Hash Values 215 in this range are partitioned into the Bin 220A. In the illustrated embodiment, the Hash Values 215A are partitioned into the Bin 220A, while the Hash Values 215B have been partitioned into the Bin 220C. No Hash Values 215 were assigned to the Bin 220B.

As illustrated, once the Hash Values 215 have been partitioned to Bins 220, the Signature Component 110 retains only the minimum Hash Value 215 in each Bin 220. For example, if the Bin 220A includes Hash Values 215 of twelve, fifteen, fifty, and seventy-two, the system only preserves the minimum value of twelve. In the illustrated embodiment, the smallest value in the Hash Values 215A is Hash Value 215C. Similarly, the smallest number for the Hash Values 215B is Hash Value 215D.

In the illustrated workflow 200, the Signature Component 110 then fills any empty Bins 220 based on the values included in one or more other Bins 220. In one embodiment, to do so, the Signature Component 110 copies the Hash Value 215 in the closest non-empty Bin 220 into the empty Bin 220. In another embodiment, for a given empty Bin (e.g., Bin 220B), the Signature Component 110 randomly selects whether to copy the first non-empty value from either the left or the right. In the illustrated embodiment, the Signature Component 110 has copied the Hash Value 215C from the Bin 220A. In an embodiment, this copying process is referred to as densification.

In the illustrated embodiment, after this densification operation, the Signature Component 110 has generated an array of signature values $[s_1, \ldots, s_m]$ to represent the Input Word 205. Specifically, in the illustrated embodiment, the array for the Input Word 205 is [Hash Value 215C, Hash Value 215C, Hash Value 215D].

In the illustrated workflow 200, the Signature Component 110 next randomly hashes this signature array into an integer in another universe U'. In the illustrated embodiment, the Signature Component 110 does so using another Hash Function 225 that recursively hashes the array of signature values into a single value/element. In the illustrated embodiment, ach step takes the sum of the current signature value $s_i$ and the hashed value of the previous step $o_{i-1}$ as input. It will then output the hashed value for the current step as $o_i$=hash($s_i$+$o_{i-1}$).

Thus, in the illustrated embodiment, the Hash Function 225 first takes, as input, the first Hash Value 215C in the array. The output of this is then used as input to the Hash Function 225 again, along with the next Hash Value 215C. Finally, the output of this operation is used as input to the Hash Function 225 along with the next Hash Value 215D. As illustrated, the last value output by the Hash Function 225 (after using the last Hash Value 215 as input) is then used as the Signature 115 for the Input Word 205.

As discussed above, given any two words, the probability of the words being assigned the same signature value is proportional to the Jaccard similarity (or any other suitable similarity metric) of these two words. Hence, in some embodiments, the system determines or assumes that all words grouped together with matching signature values are lexically similar. In many instances, these grouped words are variants of one canonical representation, which is referred to herein as the pivot. As discussed above, this pivot can then be used to replace all of the grouped words in order to normalize the text data.

Figure 3:
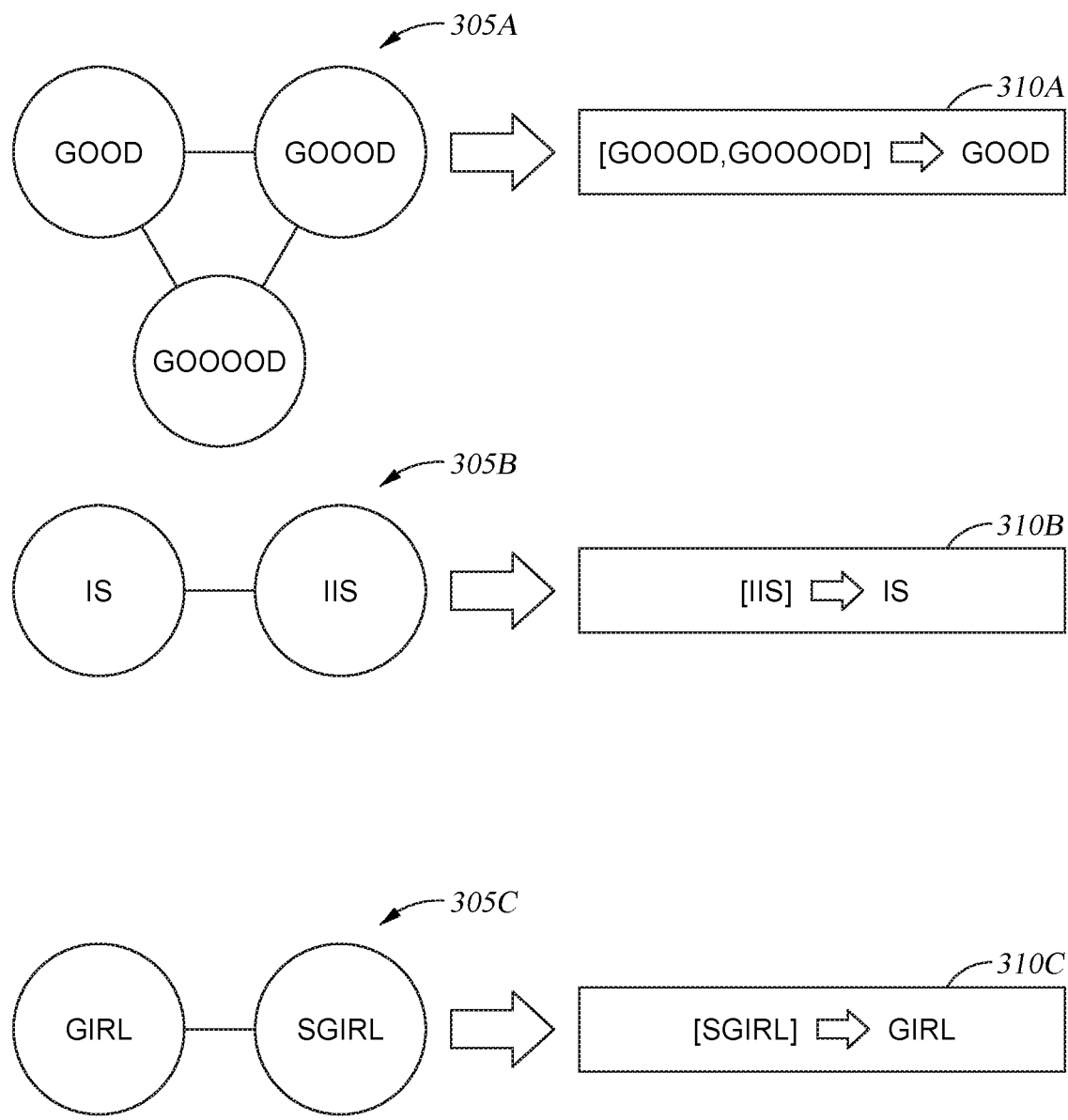
FIG. 3 depicts techniques to generate mappings based on a graph structure created using locality-sensitive hashing, according to some embodiments disclosed herein.

FIG. 3 depicts techniques to generate mappings based on a graph structure created using LSH, according to some embodiments disclosed herein. In one embodiment, the techniques depicted in FIG. 3 provide additional detail for the operations of the Mapping Component 130. In some embodiments, as discussed above, a graph component uses the generated signatures to generate a graph for the input dataset, where each node in the graph corresponds to a given word or token in the dataset. The system can then insert edges in the graph to connect any nodes that correspond to words with matching signatures. In an embodiment, the graph component can increment or set the weight of each edge based on how many times the generated signatures matched. That is, for a given edge between a first and second node (corresponding to a first and a second word, respectively), the weight of the edge can be set based on the number of times the first and second word were assigned matching signatures.

Further, as discussed above, in some embodiments, the system can prune, remove, or refrain from creating edges that are below a predefined threshold a. For example, if the signature-generation process is executed T times (generating T separate signatures for each word), the system may prune edges with a weight lower than a. In one embodiment, the threshold a is set to $$\frac{T}{2}.$$

That is, if the words were assigned matching signatures in less than half of the rounds, the system may determine that they are likely not related, and remove the edge connecting them. In another embodiment, the system may determine whether the edge weight e divided by the number of rounds T is larger than the threshold a. In such an embodiment, a value of a=0.5 can be used to determine whether the signatures match at least half of the time.

In an embodiment, the particular threshold used to prune edges is a hyperparameter that can be adjusted to affect the accuracy of the mappings. Generally, larger thresholds will result in more edges being pruned, which can reduce false positives (e.g., prevent unrelated words from mistakenly being connected), but which may introduce additional false negatives (e.g., related words may be mistakenly severed). Similarly, lower thresholds will tend to prevent false negatives, but will also tend to yield more false positives. The particular threshold utilized may vary depending on the particular implementation.

In the illustrated embodiment, the system (e.g., a mapping component) can parse the generated graph to identify subgraphs. As discussed above, a subgraph is a subset of nodes where all nodes in the subgraph are connected to all other nodes in the subgraph, either directly or indirectly. In some embodiments, the system identifies disconnected subgraphs (e.g., sets of nodes that are interconnected within the subgraph and entirely disconnected from the rest of the graph). In another embodiment, identifying the subgraphs comprises identifying, for each node, all other nodes (referred to as connected components) that are reachable via one or more undirected edges in the graph.

As illustrated, the system has identified Subgraphs 305A-C. Specifically, the Subgraph 305A includes nodes corresponding to the words "good," "goood," and "gooood." The Subgraph 305B includes nodes corresponding to the words "is," and "iis." The Subgraph 305C includes nodes corresponding to the words "girl," and "sgirl." As illustrated, based on the Subgraph 305A, the mapping component has generated a Mapping 310A indicating that the words "goood" and "gooood" are mapped to (and can be replaced by) the pivot word "good."

In one embodiment, the pivot word is selected based on the relative frequency of the words in the Subgraph 305. In such an embodiment, the system may select, as the pivot word, the word that occurred most frequently in the dataset. For example, suppose the word "good" occurred fifty times, while the word "goood" occurred twenty and the word "gooood" occurred five. In an embodiment, the system will select "good" as the pivot, and map the remaining words in the Subgraph 305 to this pivot. In the illustrated embodiment, the system has also generated Mappings 310B and 310C, indicating that the word "iis" maps to "is" and that "sgirl" maps to "girl," respectively.

In one embodiments, the selected pivot words are used as the vocabulary for the system (or for downstream text processing applications). In some embodiments, however, the system may be restricted to a limited vocabulary (e.g., to a limited number of words included in the vocabulary). In one embodiment, to determine which pivot words should be included, the system can determine the number of occurrences of each word in each Subgraph 305, and sort the Subgraphs 305 based on the aggregate frequency. That is, the system may aggregate the number of times "iis" and "is" are found in the dataset in order to determine the frequency of the Subgraph 305B. Once the Subgraphs 305 are thus sorted by size, the system can select the top N Subgraphs 305 and use the corresponding pivot words as the vocabulary.

Figure 4:
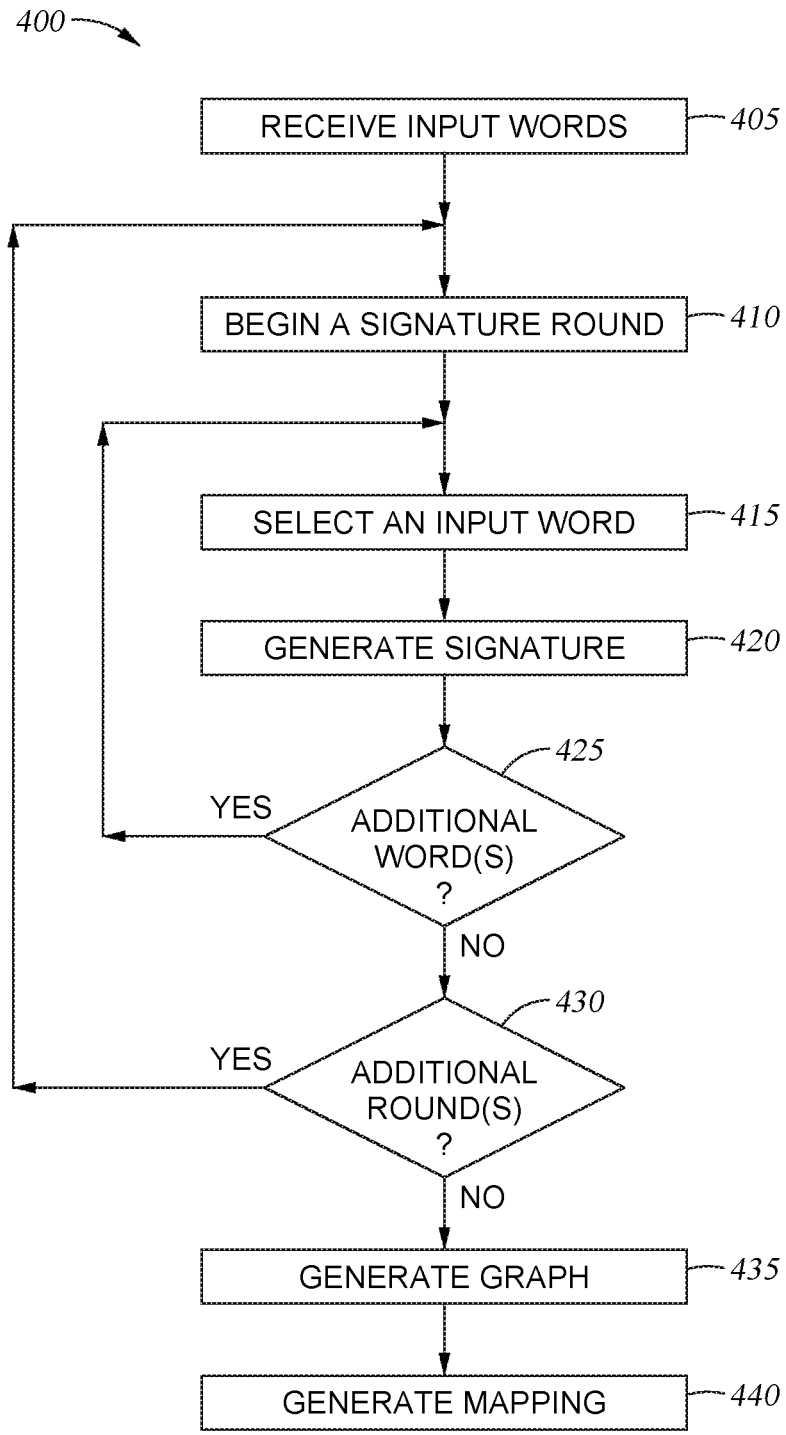
FIG. 4 is a flow diagram illustrating a method of generating mappings to normalize input data using locality-sensitive hashing, according to some embodiments disclosed herein.

FIG. 4 is a flow diagram illustrating a method 400 of generating mappings to normalize input data using LSH, according to some embodiments disclosed herein. In an embodiment, the method 400 provides additional detail for the workflows and operations discussed above with reference to FIGS. 1-3. The method 400 begins at block 405, where a set of input words (e.g., as part of a dataset) are received by a normalization system. At block 410, the normalization system begins a first round of signature-generation. In some embodiments, the signature-generation is performed once (e.g., each word has only a single signature generated). In other embodiments, because the signature-generation is somewhat randomized, the normalization system generates multiple signatures for each word.

The method 400 then continues to block 415, where the normalization system selects one of the input words in the received set. In embodiments, the normalization system may utilize any criteria in selecting the word, as all received input words will be processed. At block 420, the normalization system generates a signature for the selected word. In some embodiments, as discussed above, the normalization system does so using a LSH-based. The method 400 then proceeds to block 425.

At block 425, the normalization system determines whether there is at least one additional word remaining in the received set of input words that has not yet been processed during the current round. If so, the method 400 returns to block 415. Otherwise, the method 400 continues to block 430. At block 430, the normalization system can determine whether there is at least one additional round of signature-generation to be completed. For example, the normalization system may utilize ten signatures for each word (or some other value, configurable as a hyperparameter). If all ten rounds have been completed, the method 400 continues to block 435. If not, the method 400 returns to block 410.

For conceptual clarity, the method 400 is illustrated to include performing a sequence of rounds of signature-generation, where a signature is generated for each of the input words in each round. In some embodiments, however, the rounds may be performed in parallel or in other orders. In at least one embodiment, for T rounds, the normalization system may generate T signatures for each input word before proceeding to the next word in the input dataset.

Returning to block 435, the normalization system generates a graph based on the set of generated signatures. In some embodiments, the normalization system do so by generating a node or vertex for each of the input words, and inserting edges connecting any nodes associated with words that were assigned matching signatures at least once (or at least some threshold number or percentage of times).

Once the graph is generated, the method 400 continues to block 440, where the normalization system generates mappings based on the graph. In one embodiment, this includes identifying disconnected subgraphs in the graph, and mapping all of the words associated with each subgraph to a corresponding pivot word. The pivot word may be selected as the most-frequently occurring word in the subgraph.

These mappings can then be used to clean and normalize the input data set (as well as other data sets). Additionally, the mappings and graph can be used to normalize newly-received text. In embodiments, this normalization can be performed with significantly reduced computational resources and delay, as compared to existing approaches. This allows the normalization system to scale and operate on large datasets, enabling the processing and ingestion of more data in less time and using fewer resources. Additionally, this increased scalability and efficiency enables improved accuracy and performance for any downstream applications, such as machine learning algorithms.

Figure 5:
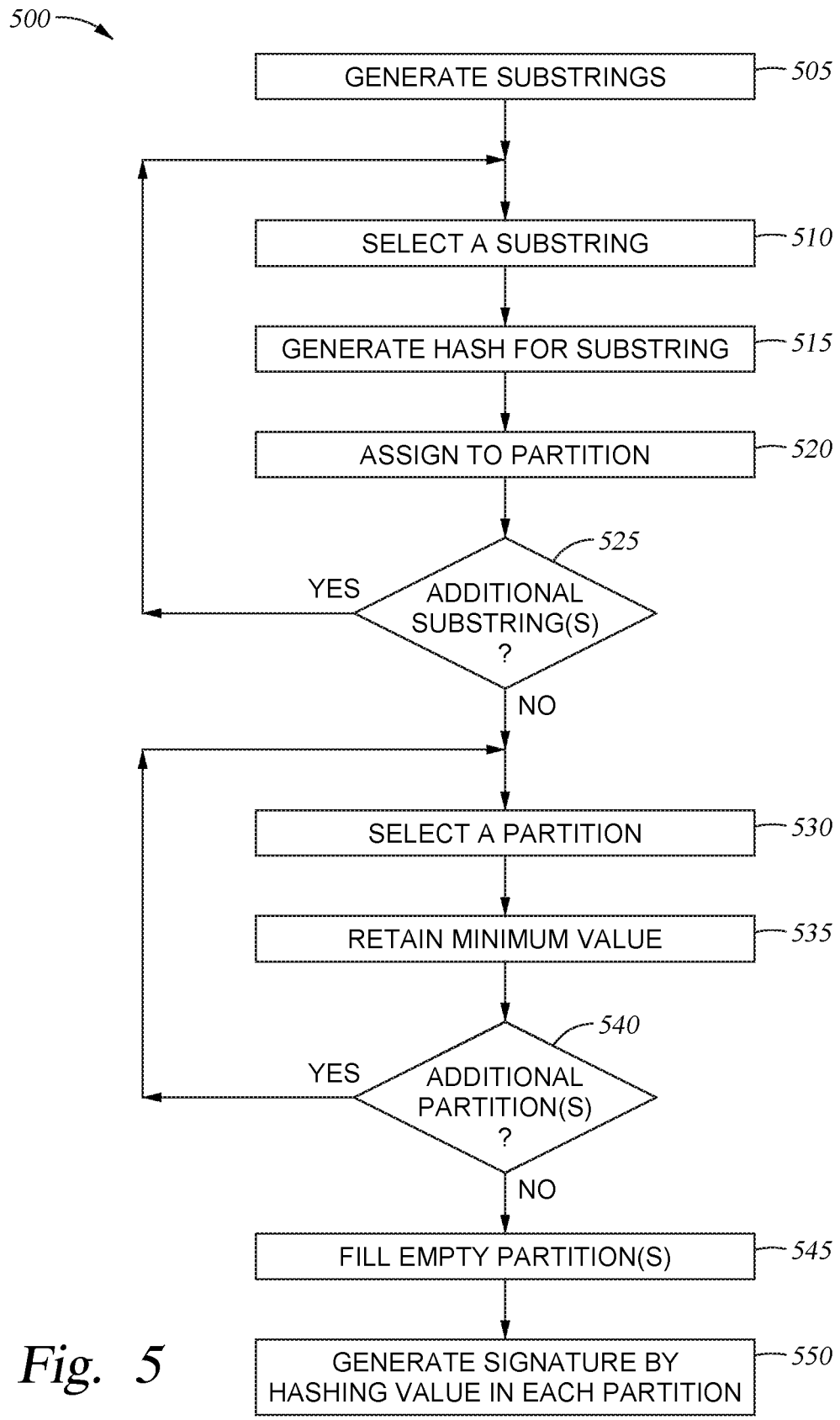
FIG. 5 is a flow diagram illustrating a method of generating signature values for input words in order to facilitate lexical normalization, according to some embodiments disclosed herein.

FIG. 5 is a flow diagram illustrating a method 500 of generating signature values for input words in order to facilitate lexical normalization, according to some embodiments disclosed herein. In one embodiment, the method 500 provides additional detail for block 420 in FIG. 4. The method 500 begins at block 505, where a normalization system generates a set of substrings for the input word that is being processed. In one embodiment, this set includes all substrings of the input word. That is, for a word of length n, the substring set can include all 1-gram substrings, all 2-gram substrings, and so on to the n-gram substring (the entire input word).

In at least one embodiment, as discussed above, the normalization system can utilize predefined criteria to limit the number of substrings created. For example, the normalization system may generate only the unigrams, trigrams, and 5-grams for the input word. Once the relevant set of substrings is created, the method 500 continues to block 510.

At block 510, the normalization system selects one of the substrings from the set. In embodiments, the normalization system may utilize any criteria to select the substring, as all substrings in the set will be evaluated during the signature-generation process. The method 500 then proceeds to block 515, where the normalization system generates a hash value for the substring. In some embodiments, the hash value is an integer generated by one or more hash algorithms (such as SHA256). Generally, the hash algorithm is selected in an effort to uniformly map the substrings into a universe of values with few collisions.

The method 500 then continues to block 520, where the normalization system assigns the generated hash value for the substring to a partition (also referred to as a bin) based on its value. This allows the normalization system to partition the substrings into separate bins in the universe. At block 525, the normalization system determines whether at least one additional substring remains to be processed. If so, the method 500 returns to block 510. Otherwise, the method 500 continues to block 530.

At block 530, the normalization system selects one of the partitions. In one embodiment, the normalization system selects from among the non-empty partitions, as the empty partitions are processed subsequently. In another embodiment, the normalization system can select any partition. In such an embodiment, if the selected partition is empty, it can be set aside for subsequent processing.

At block 535, the normalization system retains only the minimum value in the selected partition. That is, if multiple hash values were assigned to the partition, the normalization system can remove, delete, or otherwise ignore all but the smallest value in the partition. This technique (performed as part of a minimum hashing flow) allows the normalization system to generate signatures that can be used for similarity comparisons.

The method 500 then continues to block 540, where the normalization system determines whether there is at least one partition left to be evaluated. If so, the method 500 returns to block 530. If all (non-empty) partitions have been evaluated to retain only the minimum value, the method 500 continues to block 545.

At block 545, the normalization system fills any empty partitions. In some embodiments, for each empty partition, the normalization system randomly selects a direction (e.g., higher or lower) and copies the value from the nearest non-empty partition in the selected direction. That is, the normalization system may determine to select from a higher partition (e.g., to the right) or a lower partition (e.g., to the left). The normalization system then identifies the nearest non-empty partition in the selected direction, and copies the (minimum) value from that partition into the empty partition.

The method 500 then continues to block 550, where the normalization system generates a signature value for the input word based on the set of values in the partitions. For example, in one embodiment, the normalization system uses the first value (e.g., from the first or lowest partition in the universe), which is also the smallest hash remaining after pruning, and uses it as input to a hash algorithm. At each step, the hash algorithm uses the results from the prior step and the next value from the partitions, until an overall signature (e.g., an integer value) is generated for the input word.

Figure 6:
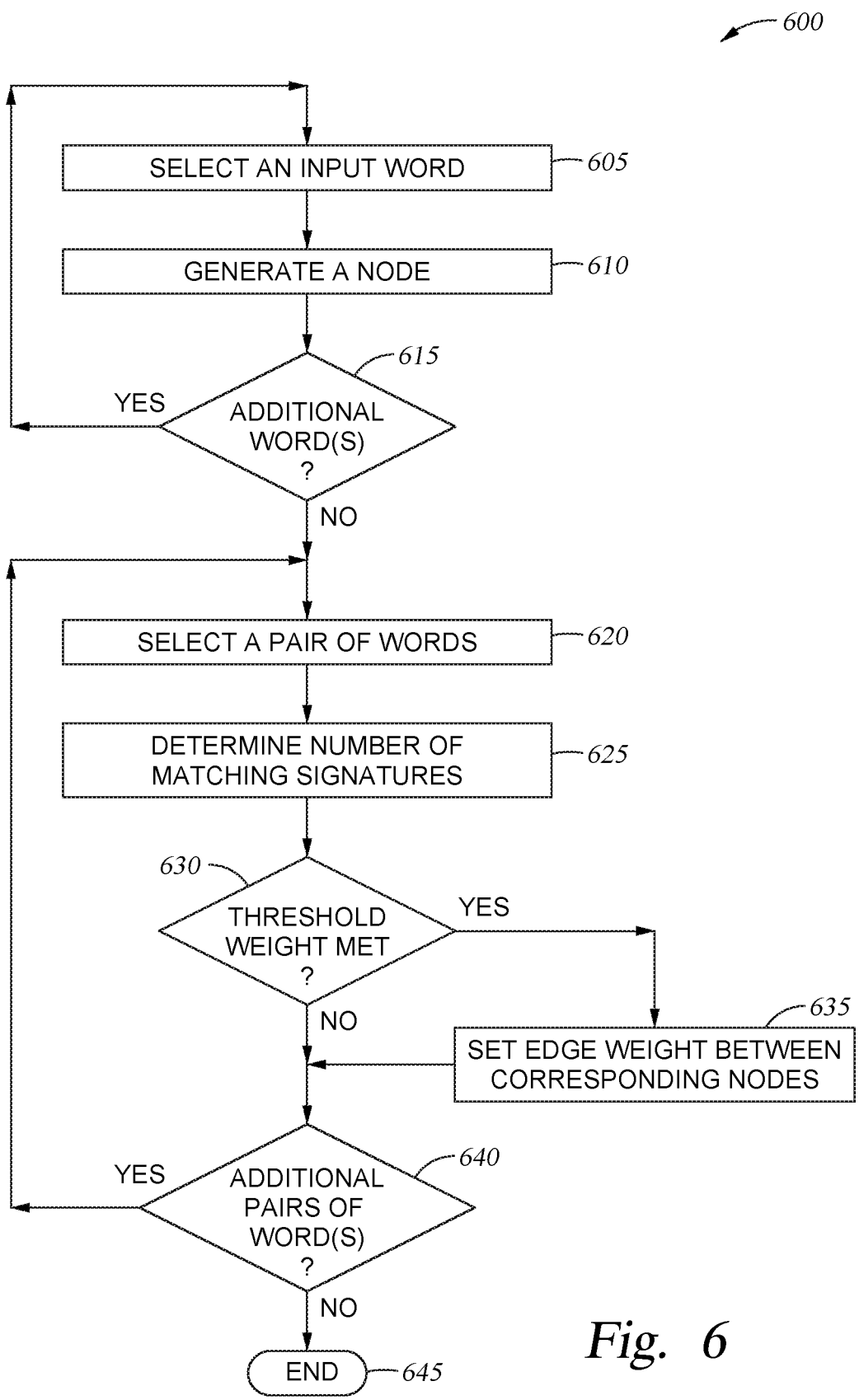
FIG. 6 is a flow diagram illustrating a method of generating a graph structure based on locality-sensitive hashing to normalize input data, according to some embodiments disclosed herein.

FIG. 6 is a flow diagram illustrating a method 600 of generating a graph structure based on LSH to normalize input data, according to some embodiments disclosed herein. In one embodiment, the method 600 provides additional detail for block 435 in FIG. 4. The method 600 begins at block 605, where the normalization system selects one of the input words from the dataset. At block 610, the normalization system generates a node for the input word. The method 600 then continues to block 615, where the normalization system determines whether there is at least one more input word to be processed. If so, the method 600 returns to block 605. In this way, the normalization system can generate a respective node for each input word. If a node has been generated for each input word, the method 600 continues to block 620.

At block 620, the normalization system selects a pair of input words. In some embodiments, the pair may be selected in any manner, as all pairs of words will be processed to generate edges in the graph. In at least one embodiment, the normalization system selects only pairs of words that were assigned the same signature during the signature-generation process. That is, rather than iteratively selecting all possible pairs, the normalization system may select a pair of words from the set of pairs that were assigned the same signature at least once. At block 625, the normalization system determines the number of matching signatures shared between the words. That is, the normalization system determines the number of times both words were assigned the same signature value. For example, suppose the normalization system generates three signatures for each word. Suppose further that a first word in the pair has signatures "seven," "nine," and "seven," and the second word in the pair has signatures "seven," "seven," and "eight." In an embodiment, the normalization system can determine that the pair of words were assigned matching signatures twice.

The method 600 then continues to block 630, where the normalization system determines whether some predefined threshold criteria is satisfied. As discussed above, this may include a minimum number of matching signatures, a minimum percentage of the signatures (e.g., at least half), and the like. If the threshold is satisfied, the normalization system creates and inserts an edge between the corresponding nodes, and sets the weight of the edge to the determined number of matching signatures. The method 600 then continues to block 640.

If, at block 630, the normalization system determines that the threshold is not satisfied, the method 600 proceeds directly to block 640. In the illustrated embodiment, the normalization system only generates edges connecting nodes that have a sufficient number of matching signatures. In some embodiments, however, the normalization system can generate edges between all nodes that have at least one matching signature, and assign weights as discussed above. This can allow the normalization system to selectively prune (or simply ignore) edges with weights below the defined threshold.

At block 640, the normalization system determines whether there is at least one additional pair of words/nodes (or at least one pair of tokens that were assigned matching signatures at least once) that has not yet been evaluated. If so, the method 600 returns to block 620. Otherwise, the method 600 terminates at block 645.

Figure 7:
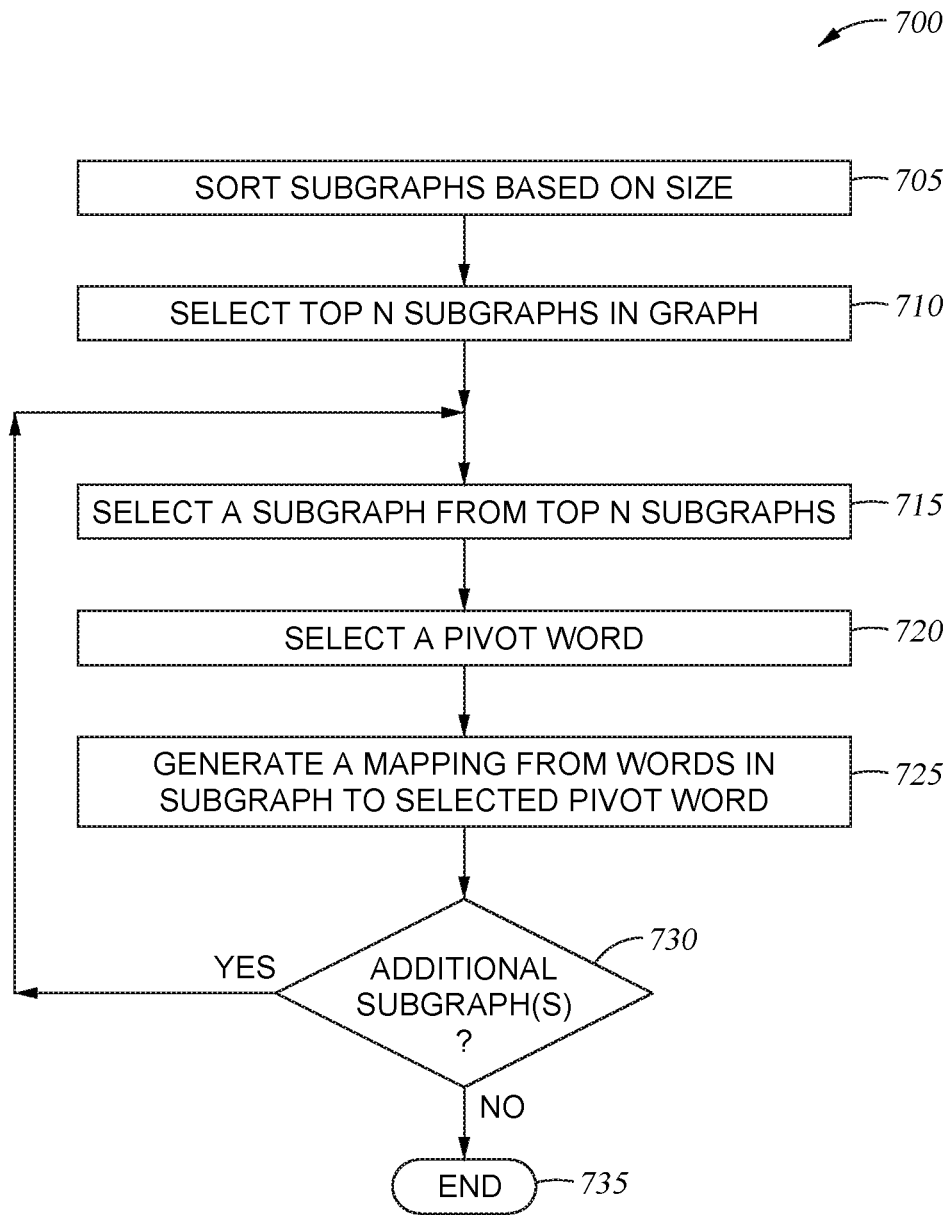
FIG. 7 is a flow diagram illustrating a method of generating mappings based on graph structures created using locality-sensitive hashing, according to some embodiments disclosed herein.

FIG. 7 is a flow diagram illustrating a method 700 of generating mappings based on graph structures created using LSH, according to some embodiments disclosed herein. In one embodiment, the method 700 provides additional detail for block 440 in FIG. 4. The method 700 begins at block 705, where a normalization system identifies subgraphs in the graph, and sorts them based on their sizes. In one embodiment, the size of a subgraph is defined based on the aggregate number of times the included words were found in the dataset. For example, if the subgraph includes "is," "iis," and "ios," the normalization system may determine the number of times each of these tokens was found in the dataset. The size of the subgraph is the sum of these numbers.

The method 700 then proceeds to block 710, where the normalization system selects the top N subgraphs, where N is hyperparameter. Generally, selecting larger values for N allows for more words to be included in the vocabulary, which can improve the accuracy and functionality of any systems that utilize the vocabulary. However, larger vocabularies also tend to require additional computing resources and time. In some embodiments, rather than limiting the selection to the top N subgraphs, the normalization system can generate mappings for all of the subgraphs. Subsequent downstream components can then decide how many words they would like to include in their own vocabulary.

At block 715, the normalization system selects a subgraph. If a restriction to N subgraphs is applied, the normalization system selects from a subgraph from the top N. The method 700 then continues to block 720, where the normalization system selects a pivot word for the selected subgraph. In one embodiment, the normalization system determines, for each word associated with the subgraph, the number of times the word appeared in the dataset. The normalization system can then select the most-frequent word (e.g., the word with the highest number of occurrences) as the pivot for the subgraph.

The method 700 then continues to block 725, where the normalization system generates a mapping from all words in the subgraph to the selected pivot word. That is, the normalization system generates a mapping indicating that each time a word associated with the subgraph is found in a dataset, it should be replaced with the pivot word. The method 700 then proceeds to block 730.

At block 730, the normalization system determines whether there is at least one additional subgraph in the graph that has not been evaluated. If so, the method 700 returns to block 715. Otherwise, the method 700 terminates at block 735.

Figure 8:
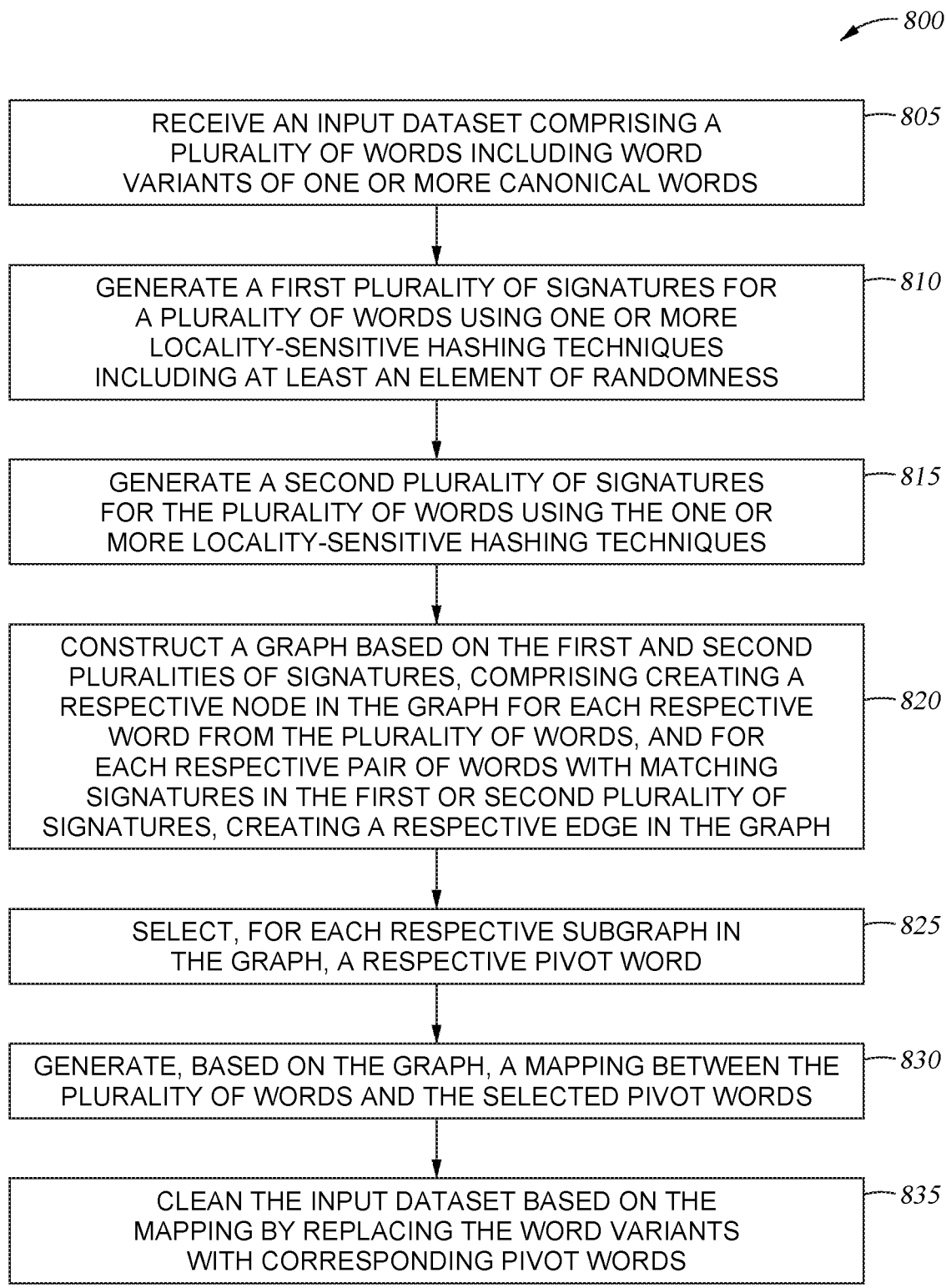
FIG. 8 is a flow diagram illustrating a method of generating mappings to normalize input data, according to some embodiments disclosed herein.

FIG. 8 is a flow diagram illustrating a method 800 of generating mappings to normalize input data, according to some embodiments disclosed herein. The method 800 begins at block 805, where a normalization system receives an input dataset comprising a plurality of words including word variants of one or more canonical words. At block 810, the normalization system generates a first plurality of signatures for a plurality of words using one or more locality-sensitive hashing techniques including at least an element of randomness. The method 800 then proceeds to block 815, where the normalization system generates a second plurality of signatures for the plurality of words using the one or more locality-sensitive hashing techniques. Further, at block 820, the normalization system constructs a graph based on the first and second pluralities of signatures, comprising: creating a respective node in the graph for each respective word from the plurality of words, and for each respective pair of words with matching signatures in the first or second plurality of signatures, creating a respective edge in the graph. The method 800 then continues to block 825, where the normalization system selects, for each respective subgraph in the graph, a respective pivot word. At block 830, the normalization system generates, based on the graph, a mapping between the plurality of words and the selected pivot words. Additionally, at block 835, the normalization system cleans the input dataset based on the mapping by replacing the word variants with corresponding pivot words.

Figure 9:
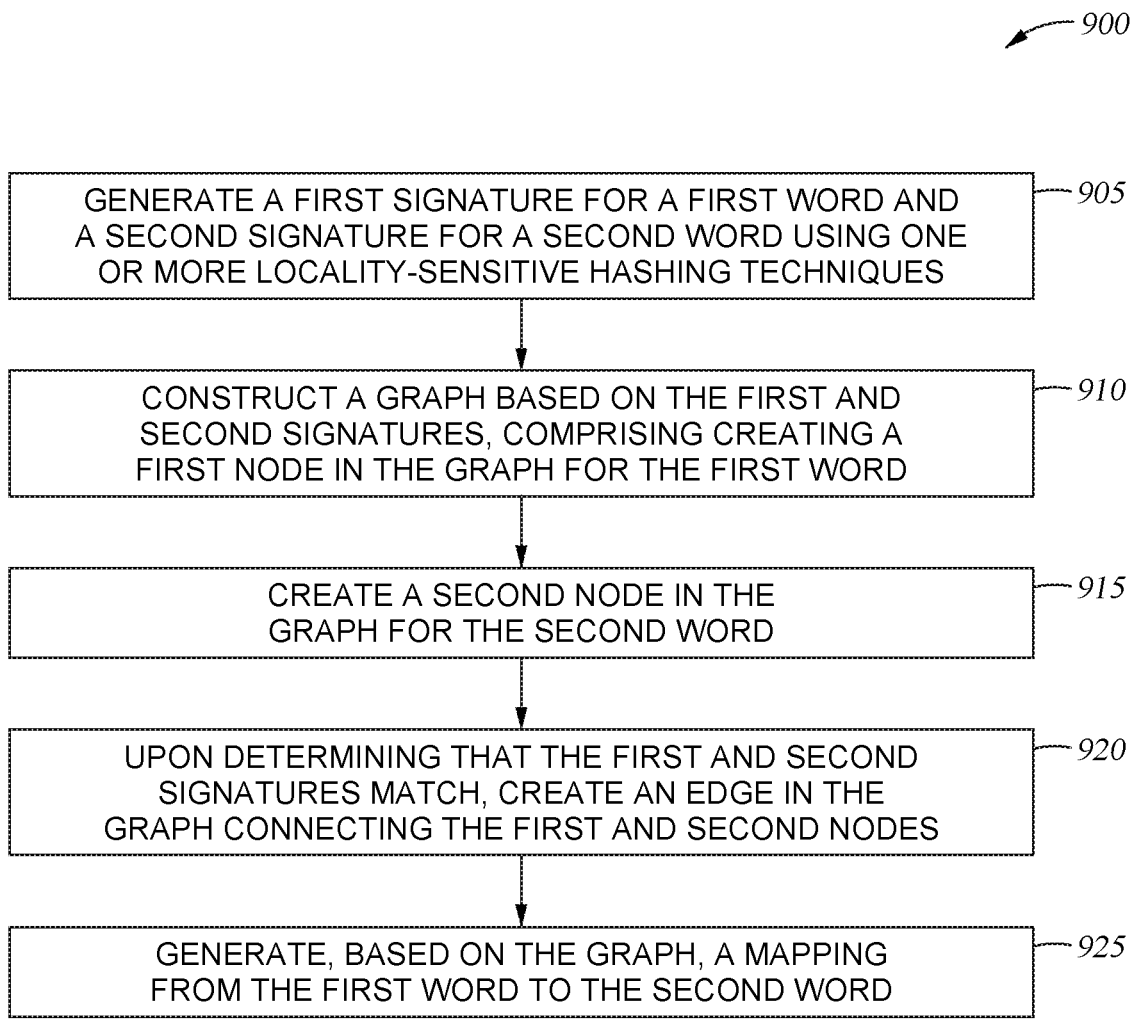
FIG. 9 is a flow diagram illustrating a method of generating mappings to normalize input data, according to some embodiments disclosed herein.

FIG. 9 is a flow diagram illustrating a method 900 of generating mappings to normalize input data, according to some embodiments disclosed herein. The method 900 begins at block 905, where a normalization system generates a first signature for a first word and a second signature for a second word using one or more locality-sensitive hashing techniques. At block 910, the normalization system constructs a graph based on the first and second signatures, comprising creating a first node in the graph for the first word. Further, at block 915, the normalization system creates a second node in the graph for the second word. Additionally, at block 920, upon determining that the first and second signatures match, the normalization system creates an edge in the graph connecting the first and second nodes. The method 900 then continues to block 925, where the normalization system generates, based on the graph, a mapping from the first word to the second word.

Figure 10:
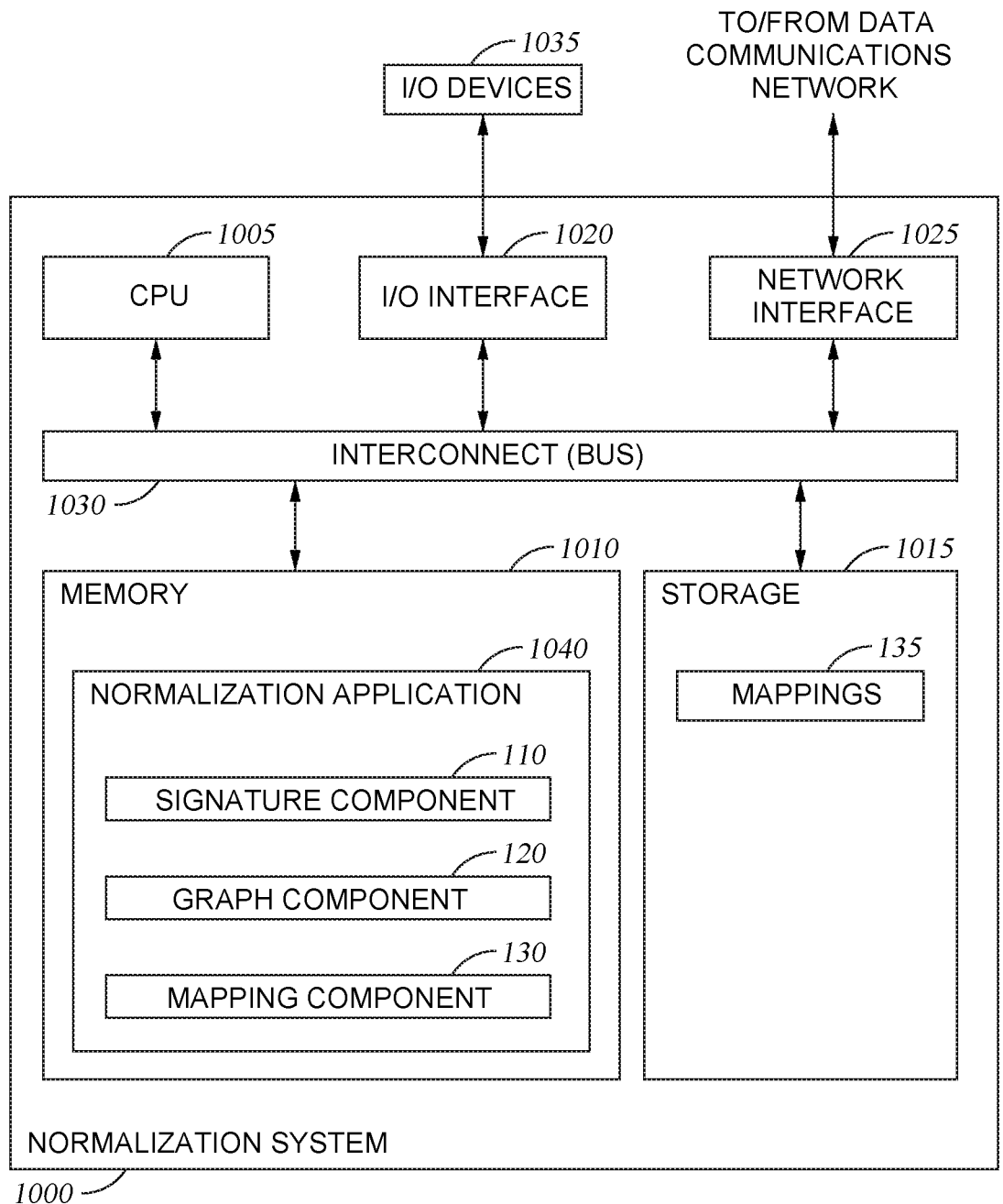
FIG. 10 is a block diagram illustrating a computing device configured to perform text normalization using locality-sensitive hashing, according to some embodiments disclosed herein.

FIG. 10 is a block diagram illustrating a Normalization System 1000 configured to perform text normalization using LSH, according to some embodiments disclosed herein. Although depicted as a physical device, in embodiments, the Normalization System 1000 may be implemented as a virtual device or service, and/or across a number of devices (e.g., in a cloud environment). As illustrated, the Normalization System 1000 includes a CPU 1005, Memory 1010, Storage 1015, one or more I/O Interfaces 1020, and a Network Interface 1025. The components are interconnected via one or more Interconnects 1030.

In the illustrated embodiment, the CPU 1005 retrieves and executes programming instructions stored in Memory 1010, as well as stores and retrieves application data residing in Storage 1015. The CPU 1005 is generally representative of a single CPU and/or GPU, multiple CPUs and/or GPUs, a single CPU and/or GPU having multiple processing cores, and the like. The Memory 1010 is generally included to be representative of a random access memory. Storage 1015 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 1035 (such as a mouse, a keyboard, a monitor, a touchscreen, etc.) are connected via the I/O Interface(s) 1020. Further, via the Network Interface 1025, the Normalization System 1000 can be communicatively coupled with one or more other devices and components (e.g., directly or via one or more network, which may include the Internet, local network(s), and the like).

In the illustrated embodiment, the Storage 1015 includes a set of Mappings 135. As discussed above, the Mappings 135 generally indicate one or more pivot words that can be used to replace one or more other words in input datasets. In the illustrated embodiment, the Memory 1010 includes a Normalization Application 1040. The Normalization Application 1040 is generally configured to perform one or more of the embodiments discussed herein. Although depicted as software residing in Memory 1010, in embodiments, the functionality of the Normalization Application 1040 may be implemented using software, hardware, or a combination of software and hardware. As illustrated, the Normalization Application 1040 includes a Signature Component 110, a Graph Component 120, and a Mapping Component 130. Although depicted as discrete components for conceptual clarity, in embodiments, the operations of the Signature Component 110, Graph Component 120, and Mapping Component 130 may be combined or distributed across any number of components and devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Normalization Application 1040) or related data available in the cloud. For example, the Normalization Application 1040 could execute on a computing system in the cloud and evaluate inputs to generate mappings and normalize the dataset. In such a case, the Normalization Application 1040 could normalize datasets and store generated mappings and graphs at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving an input dataset comprising a plurality of words including word variants of one or more canonical words;
generating a first plurality of signatures for a plurality of words using one or more locality-sensitive hashing techniques including at least an element of randomness;
generating a second plurality of signatures for the plurality of words using the one or more locality-sensitive hashing techniques;
constructing a graph based on the first and second pluralities of signatures, comprising:
creating a respective node in the graph for each respective word from the plurality of words; and
for each respective pair of words with matching signatures in the first or second plurality of signatures, creating a respective edge in the graph;
selecting, for each respective subgraph in the graph, a respective pivot word;
generating, based on the graph, a mapping between the plurality of words and the selected pivot words; and
cleaning the input dataset based on the mapping by replacing the word variants with corresponding pivot words.

2. The computer-implemented method of claim 1, wherein constructing the graph further comprises:
assigning a respective weight to each respective edge in the graph based on a number of times the corresponding pair of words were assigned matching signatures by the one or more locality-sensitive hashing techniques.

3. The computer-implemented method of claim 2, wherein constructing the graph further comprises:
identifying one or more edges in the graph with a weight below a predefined pruning criterion; and
pruning the identified one or more edges.

4. The computer-implemented method of claim 1, the method further comprising:
receiving a second input dataset comprising a second plurality of words;
determining that a first word of the second plurality of words is not included in the graph;
generating a first signature for the first word using the one or more locality-sensitive hashing techniques; and
mapping the first word to a first pivot word based on the first signature.

5. The computer-implemented method of claim 1, wherein generating the first plurality of signatures using one or more locality-sensitive hashing techniques comprises, for a first word of the plurality of words:
generating a set of sub strings contained within the first word;
generating a plurality of hash values for the set of sub strings;
partitioning the plurality of hash values into a plurality of bins;
selecting a representative value for each respective bin of the plurality of bins, wherein the representative value is a smallest value in the respective bin;
filling one or more empty bins of the plurality of bins based on representative values for adjacent bins; and
generating a first signature for the first word based on hashing the representative values.

6. A non-transitory computer readable medium comprising computer readable code executable by one or more processors to perform an operation comprising:
generating a first signature for a first word and a second signature for a second word using one or more locality-sensitive hashing techniques;
constructing a graph based on the first and second signatures, comprising:
creating a first node in the graph for the first word;
creating a second node in the graph for the second word; and
upon determining that the first and second signatures match, creating an edge in the graph connecting the first and second nodes; and
generating, based on the graph, a mapping from the first word to the second word.

7. The non-transitory computer readable medium of claim 6, the operation further comprising:
generating a first plurality of signatures for the first word using the one or more locality-sensitive hashing techniques a plurality of times;
generating a second plurality of signatures for the second word using the one or more locality-sensitive hashing techniques a plurality of times; and
updating the graph based on the first and second pluralities of signatures.

8. The non-transitory computer readable medium of claim 6, the operation further comprising:
constructing the graph based on a plurality of signatures for a plurality of words;
selecting, for each respective subgraph in the graph, a respective pivot word; and
generating, based on the graph, a mapping between the plurality of words and the selected pivot words.

9. The non-transitory computer readable medium of claim 6, wherein constructing the graph comprises:
assigning a weight to the edge between the first and second nodes based on a number of times the first and second words were assigned matching signatures by the one or more locality-sensitive hashing techniques.

10. The non-transitory computer readable medium of claim 9, the operation further comprising:
identifying one or more edges in the graph with a weight below a predefined pruning criterion; and
pruning the identified one or more edges.

11. The non-transitory computer readable medium of claim 6, the operation further comprising:
determining that a third word is not included in the graph;
generating a third signature for the third word using the one or more locality-sensitive hashing techniques; and
generating, based on the third signature, a mapping between the first and third words.

12. The non-transitory computer readable medium of claim 6, wherein generating the first signature using the one or more locality-sensitive hashing techniques comprises:

generating a set of sub strings contained within the first word;

generating a plurality of hash values for the set of sub strings;

partitioning the plurality of hash values into a plurality of bins;

selecting a representative value for each respective bin of the plurality of bins, wherein the representative value is a smallest value in the respective bin;

filling one or more empty bins of the plurality of bins based on representative values for adjacent bins; and generating a first signature for the first word based on hashing the representative values.

13. The non-transitory computer readable medium of claim 6, the operation further comprising:

selecting the first word as a pivot word; and replacing each instance of the second word in a dataset with the first word.

14. A computer-implemented method, comprising:

generating a first signature for a first word and a second signature for a second word using one or more locality-sensitive hashing techniques;

constructing a graph based on the first and second signatures, comprising:

creating a first node in the graph for the first word;

creating a second node in the graph for the second word; and upon determining that the first and second signatures match, creating an edge in the graph connecting the first and second nodes; and generating, based on the graph, a mapping from the first word to the second word.

15. The computer-implemented method of claim 14, the method further comprising:

generating a first plurality of signatures for the first word using the one or more locality-sensitive hashing techniques a plurality of times;

generating a second plurality of signatures for the second word using the one or more locality-sensitive hashing techniques a plurality of times; and updating the graph based on the first and second pluralities of signatures.

16. The computer-implemented method of claim 14, the method further comprising:

constructing the graph based on a plurality of signatures for a plurality of words;

selecting, for each respective subgraph in the graph, a respective pivot word; and generating, based on the graph, a mapping between the plurality of words and the selected pivot words.

17. The computer-implemented method of claim 14, wherein constructing the graph comprises:

assigning a weight to the edge between the first and second nodes based on a number of times the first and second words were assigned matching signatures by the one or more locality-sensitive hashing techniques.

18. The computer-implemented method of claim 17, the method further comprising:

identifying one or more edges in the graph with a weight below a predefined pruning criterion; and pruning the identified one or more edges.

19. The computer-implemented method of claim 14, the method further comprising:

determining that a third word is not included in the graph;

generating a third signature for the third word using the one or more locality-sensitive hashing techniques; and generating, based on the third signature, a mapping between the first and third words.

20. The computer-implemented method of claim 14, wherein generating the first signature using the one or more locality-sensitive hashing techniques comprises:

generating a set of sub strings contained within the first word;

generating a plurality of hash values for the set of sub strings;

partitioning the plurality of hash values into a plurality of bins;

selecting a representative value for each respective bin of the plurality of bins, wherein the representative value is a smallest value in the respective bin;

filling one or more empty bins of the plurality of bins based on representative values for adjacent bins; and generating a first signature for the first word based on hashing the representative values.

* * * * *

UNITED STATES PATENT AND TRADEMARK OFFICE
CERTIFICATE OF CORRECTION

| | |
|---|---|
| PATENT NO. | : 11,244,156 B1 |
| APPLICATION NO. | : 17/083921 |
| DATED | : February 8, 2022 |
| INVENTOR(S) | : Vihan Sankaran Lakshman et al. |

It is certified that error appears in the above-identified patent and that said Letters Patent is hereby corrected as shown below:

On the Title Page

In item (74), in Column 2, in "Attorney, Agent or Firm", Line 1, delete "Shendan," and insert -- Sheridan, --.

Signed and Sealed this
Twenty-sixth Day of April, 2022

Katherine Kelly Vidal
*Director of the United States Patent and Trademark Office*